US012093361B2

(12) United States Patent
Miething et al.

(10) Patent No.: US 12,093,361 B2
(45) Date of Patent: Sep. 17, 2024

(54) METHOD FOR AUTHENTICATING INTERACTIONS INDEPENDENT OF A SYSTEM TIME, DEVICE FOR CARRYING OUT THIS METHOD AND FLAME DETECTOR COMPRISING SUCH A DEVICE

(71) Applicant: DURAG GmbH, Hamburg (DE)

(72) Inventors: Lorenz Miething, Freiburg (DE); Lukas Fey, Emmendingen (DE); Fabian Nöller, Emmendingen (DE)

(73) Assignee: DURAG GmbH (DE)

( * ) Notice: Subject to any disclaimer, the term of this patent is extended or adjusted under 35 U.S.C. 154(b) by 370 days.

(21) Appl. No.: 17/704,108

(22) Filed: Mar. 25, 2022

(65) Prior Publication Data

US 2022/0358200 A1 Nov. 10, 2022

(30) Foreign Application Priority Data

May 7, 2021 (DE) .......................... 102021112041.1

(51) Int. Cl.
*G06F 21/34* (2013.01)
*G06F 21/33* (2013.01)
(Continued)

(52) U.S. Cl.
CPC .............. *G06F 21/34* (2013.01); *G06F 21/33* (2013.01); *G06F 21/42* (2013.01); *G06F 21/602* (2013.01)

(58) Field of Classification Search
CPC ...................................................... G06F 21/34
See application file for complete search history.

(56) References Cited

U.S. PATENT DOCUMENTS 9,053,304 B2 * 6/2015 Ronda ................ H04L 63/0853
10,091,195 B2 * 10/2018 Lindemann ......... H04L 63/0853
(Continued)

*Primary Examiner* — Simon P Kanaan
(74) *Attorney, Agent, or Firm* — Merek, Blackmon & Voorhees, LLC

(57) ABSTRACT

The invention relates to a method and a device, in particular a flame monitor, for authenticating interactions in microcontroller- and/or FPGA-based devices or appliances independently of a system time, in particular in embedded systems, in which a cryptographic hash value (R'TOTP, RTOTP) which may also be present in truncated form is calculated in a requesting device (10) and in an authenticating device (30) on the basis of a shared secret (S) used by both devices (10, 30) and in a TOTP module (12, 32) that operates in both devices (10, 30) in accordance with the TOTP method, wherein instead of a system time (R) a predefinable item of information (R) for computing the respective hash values (R'TOTP, RTOTP) is fed to the TOTP modules (12, 32), in such a way that the predefinable item of information (R) is generated or provided by the authenticating device (30) and in response to a request from the requesting device (10) or in response to direct input to the authenticating device (30) is transmitted to the requesting device (10), where it is then fed to the TOTP module therein (12) in order to compute a hash value, and the hash value (R'TOTP) computed there is passed on to the authenticating device (30), and such that, if said hash value (R'TOTP, RTOTP) received by the authenticating device (30) is identical to the hash value (R'TOTP) computed in the authenticating device (30) using the predefined item of information (R), authentication is successful and the interaction is released, or otherwise blocked in the case of a mismatch.

20 Claims, 4 Drawing Sheets

Figure 1:
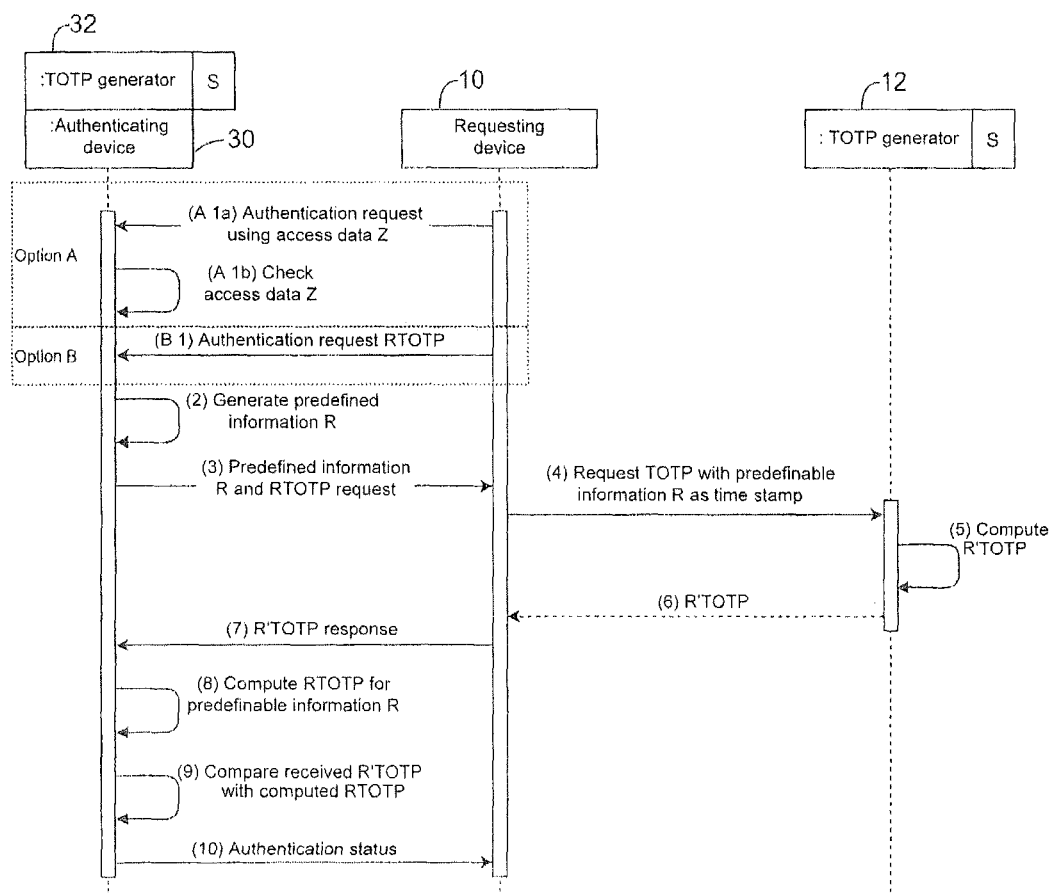

(51) Int. Cl.
*G06F 21/42* (2013.01)
*G06F 21/60* (2013.01)

(56) References Cited

U.S. PATENT DOCUMENTS

| | | | |
|---|---|---|---|
| 10,176,310 B2* | 1/2019 | Baghdasaryan | H04L 9/0822 |
| 10,270,748 B2* | 4/2019 | Briceno | H04L 9/006 |
| 10,769,635 B2* | 9/2020 | Lindemann | H04L 63/0861 |
| 11,831,409 B2* | 11/2023 | Lindemann | H04L 9/0861 |
| 2017/0346851 A1* | 11/2017 | Drake | H04L 9/0838 |
| 2018/0013832 A1* | 1/2018 | Lee | H04L 63/0846 |
| 2018/0310174 A1* | 10/2018 | Rougier | H04W 12/04 |
| 2020/0014683 A1* | 1/2020 | Russell | H04W 12/50 |

* cited by examiner

METHOD FOR AUTHENTICATING INTERACTIONS INDEPENDENT OF A SYSTEM TIME, DEVICE FOR CARRYING OUT THIS METHOD AND FLAME DETECTOR COMPRISING SUCH A DEVICE

RELATED APPLICATION

The subject patent application claims priority from German Patent Application No. DE 102021112041.1 filed on May 7, 2021, the entire contents of which are incorporated herein by reference.

DESCRIPTION

The invention relates to a method for authenticating interactions in microcontroller- and/or field programmable gate array (FPGA)-based devices or appliances independently of a system time, in particular in embedded systems, to a device for performing said method and to a flame monitor comprising such a device.

In interactions between devices that communicate with each other, an identification process is generally required in order to grant access to a requesting device and, for example, to issue the respective authorizations on an authenticating device. Identification, i.e. asserting an identity to request a login, with subsequent authentication, i.e. verification and validation of the asserted identity that has been obtained, plays a significant role in securing digital access.

Identification is thus the process of proving that an entity is actually what it claims to be. Identity can be verified or checked by means of such proof. In the case of a two-factor identification process, also referred to often as two-factor authentication (abbreviated to "2FA"), the security of the respective digital access is increased by an additional factor. "2FA" thus refers to the process of proving a user's identity with a combination of two authentication components or factors that are different from and independent of each other. Typical examples include using a bank card and PIN at cash dispensers, a fingerprint and access code in buildings, or a password and transaction number (TAN) in online banking. If access to a system cannot be controlled and limited by other measures, 2FA should always be used for security reasons.

These two methods have been established in the IT environment for years. In the embedded environment, however, requesting a single shared secret (e.g. a password) is often the only form of system access security. Due to the increasing complexity of industrial systems and their seamless connection to existing IT systems, embedded systems also need to be improved and adapted.

Common and established processes and algorithms already established in the IT environment should be used for such adaptation in order to be consistent and compatible with other fields. However, this is not always possible in the embedded environment, for example because there are not enough resources available, or because the initial situations normally found in IT, for example, differ too greatly from those in the embedded environment. To ensure cybersecurity when connecting IT and OT, those processes need to be adapted accordingly.

In contrast to conventional systems installed in desktop computers, servers, smartphones and tablets, the present invention concerns embedded systems that are specifically used to measure and collect data, or to control other components or systems.

An "embedded system" is understood to mean a microcontroller system or an FPGA system that carries out a specifically assigned task, is embedded or integrated in a surrounding system and interacts with or through that system. It is used, in particular, for measuring, capturing and forwarding data, or to control actuators, components or systems.

These embedded systems, i.e. microcontroller- or FPGA-based devices and appliances, often have fewer computing resources and, even more often, a very limited power supply compared to their powerful counterparts from the IT environment. The environment in which these activities are carried out is often far removed from the ideal operating conditions for electronic components and is called an "embedded" environment.

Taking the example of a sensor for flow measurement, the latter is used, for example, on gas pipelines in extremely harsh environments and under very difficult operating conditions. For example, this could be a minimum temperature of −30° C. or a maximum temperature of +100° C. Real-time capability can also be important for flow control, for example to control valves accordingly. When such systems are used, constant movement, shocks and other variable disturbances of a physical nature must be taken into account just as much as error-free operation despite electromagnetic interference pulses, for example. Another aspect in many cases is that there is no way of creating a permanent connection to such a device (e.g. data links for monitoring or synchronization purposes). In many cases, there is not even a guarantee of a permanent, stable power supply. The situation is also similar with flame monitors. A flame monitor is used to monitor the presence of a flame, for example in at least one part of a combustion chamber. An essential component of a flame monitor is a flame sensor for detecting a physical variable of a flame, in particular an intensity of electromagnetic radiation, and for generating an associated electrical sensor signal.

Nevertheless, it is also necessary to provide security mechanisms in the embedded environment, particularly in the environment of such sensors, so that external access to such systems is possible only with authorization. However, the lack of resources, the difficult working environment and possibly the absence of a connection to computing centers and servers is a new and huge challenge for the manufacturer.

Before discussing the present invention in more detail here, it is firstly necessary to explain briefly some terms that will be used below.

Requesting Device

The requesting device submits a request for access (e.g. to a resource) to the authenticating device.

Authenticating Device

The authenticating device checks the details provided by the requesting device for validity. If the result of the check is positive, authentication is declared, otherwise access is denied.

OTP

OTP stands for "one-time password". A one-time password is a password used for authentication or also for authorization. Every one-time password should only be valid for one single use and therefore should not be used a second time.

OCRA

The challenge-response method is a secure method of authenticating a subscriber on the basis of knowledge. One subscriber sets a challenge to which the other subscriber must respond in order to prove that it knows a certain item of information (a shared secret), without itself transferring that information. This provides protection against hackers eavesdropping on the line and obtaining the specific information (shared secret).

CLI (Command Line Interface)

A command line interface (CLI) accepts commands to a computer program in the form of lines of text.

IT

"IT" is the common term for the entire range of technologies for information processing, including software, hardware, communication technologies and associated services. IT generally does not include embedded technologies that generate data for corporate use.

OT

Operational technology (OT) refers to hardware and software that detects or causes a change by directly monitoring and/or controlling physical devices, systems, processes and events.

HMAC-SHA1

A message authentication code (MAC) is used to obtain certainty about the origin of data or messages and to check their integrity. MAC algorithms require two input parameters, firstly the data to be protected, and secondly a secret key. From these two parameters, MAC algorithms calculate a checksum, the message authentication code. A keyed-hash message authentication code (HMAC) is a message authentication code (MAC) involving a cryptographic hash function, such as the secure hash algorithm (SHA), in combination with a secret key. The combination is referred to as HMAC-SHA1, where the number 1 stands for the variant of the cryptographic hash function being used.

Truncation

In mathematics and informatics, truncation is understood as limiting the number of digits to the right of the decimal point. In the present context, this means reducing the length of a given output value. A truncated value is thus a value whose length has been made shorter.

OTP Token Digits

The number of OTP token digits describes the number of digits and thus the length that a computed OTP token must have.

Different authentication methods are currently known and commonly used. The OTP method is one of the most frequently used methods for 2FA. There are three standard ways, in particular, of implementing the OTP procedure.

HOTP—"RMAC-based One-time Password Algorithm" (A Definition of this Algorithm can be Found in the Generally Available Document "Request for Comments No. 4226", Abbreviated to "RFC 4226")

A secret (OTP key) shared by the user's device and the authenticating device is required for user login by means of cryptographic algorithms and a counter that increases with each login attempt.

This counter must always be in the synchronized range on both the authenticating device and the user's requesting device, because only then can the resulting computation of a shared token (e.g. a 6-8 OTP token) be recognized as valid.

The problem with the HOTP method is that the counters on both devices, i.e. the requesting device and the authenticating device, must always be in a predefined range relative to each other. If an HOTP generator is used for a plurality of authenticating devices, the counter on the requesting device increases with a different interval than on the authenticating devices.

HOTP Example

Three authenticating devices (A, B, C)
One requesting device

| Login 1 to authenticating device "A" | Counter on authenticating device "A" = 1 | Counter on requesting device = 1 |
| Login 1 to authenticating device "B" | Counter on authenticating device "B = 1 | Counter on requesting device = 2 |
| Login 1 to authenticating device "C" | Counter on authenticating device "C" = 1 | Counter on requesting device = 3 |
| Login 2 to authenticating device "A" | Counter on authenticating device "A" = 2 | Counter on requesting device = 4 |

It is not possible to keep the counter of the requesting device synchronized with the counter of the authenticating device; each new login makes them "drift" further apart.

Thus, a requesting device can only ever be used to access an authenticating device. It is not possible, therefore, to use a single HOTP key for authentication on several different authenticating devices. This means, for example, that several hundred HOTP keys must also be used and managed in order for a requesting device to access several hundred authenticating devices, since the counter values for each HOTP key may differ from each other.

TOTP—"Time-based One-time Password Algorithm" (A Definition of this Algorithm Can Be Found in the Generally Available Document "Request for Comments No. 6238", Abbreviated to "RFC 6238")

A secret (OTP key) shared by the user's device and the authenticating device is required for user login by means of cryptographic algorithms and the current, shared time of the authenticating device and the requesting device. This time must always be synchronous on both the authenticating device and the user's requesting device, so that the resultant computation of a common token (e.g. a 6-8 OTP token, alternating cyclically) is recognized as valid. If a TOTP Generator is used to log in, it is essential to ensure that using the same time for computation is mandatory on all the devices involved. However, in the industrial environment (sensors, actuators, controls), particularly, time synchronization is rarely specified, or in some cases not at all, or even impossible. The more the time stamps used respectively by the requesting and the authenticating device, and from which the TOTP tokens are derived, differ from one another within the tolerated TOTP time interval, i.e. within the fixed lifespan of a TOTP token, the more difficult a login becomes, as the acceptance window for the TOTP token becomes smaller and smaller. If the difference is greater than the TOTP time interval, login is no longer possible. So if the aim is a TOTP method, a synchronized time is mandatory on both devices, not only on the requesting device but also on the authenticating device.

OCRA—"OATH Challenge-Response Algorithm"
(A Definition of this Algorithm Can Be Found in the Generally Available Document "Request for Comments No. 6287", abbreviated to "RFC 6287")

The challenge-response method is a generally accepted method used in those applications and scenarios in which users who cannot use a synchronized authentication system are provided with an asynchronous variant of an authentication system. Such a challenge-response mode for authentication is known from the prior art. Several manufacturers already provide software applications and hardware devices that implement a challenge-response method, but each of them uses proprietary algorithms that disadvantageously are specific to that manufacturer. The OCRA Standard is a standardized modification of the classic challenge-response method, in that the usual methods were implemented by different manufacturers in different proprietary ways. Unlike the classic variant, OCRA is based on a common shared secret which must have been stored and configured beforehand on both the requesting device and the authenticating device. However, this standard has not been accepted in every field. This seems to be the reason why there are no hardware dongles for the OCRA method available on the market that allow automated use. Proprietary variants are still commonly used, in contrast. Using OCRA with a hardware dongle therefore requires a fixed linkage and an associated dependency on a special manufacturer. In networks involving components made by different manufacturers, this stands in the way of using hardware dongles for the OCRA method.

The object of the present invention is to specify a method and a device for authenticating independently of a system time, which allows interactions in microcontroller- and/or FPGA-based devices or appliances and in particular in embedded systems and/or flame monitors. It is also an object of the invention to provide a device for performing such a method and a flame monitor having such a device.

This object is achieved by a method according to the features of claim 1.

Developments of this method form the subject matter of dependent claims 2 to 11.

A device for performing the method is the subject matter of claim 12. A flame monitor according to the present invention forms the subject matter of claim 14.

The method according to the invention thus specifies the following for authenticating interactions in microcontroller- and/or FPGA-based devices or appliances independently of a system time, in particular in embedded systems and/or flame monitors: A cryptographic hash value, which can also be in truncated form, is computed in a requesting device and in an authenticating device on the basis of a shared secret used by both devices and in a TOTP module that operates in both devices in accordance with the TOTP method. Instead of a system time, a predefinable item of information for computing the respective hash values is fed to the TOTP modules in such a way that the predefinable information (e.g. a random value) is generated or provided by the authenticating device and in response to a request from the requesting device is transmitted to the requesting device. There it is fed to the TOTP module therein for computing a proprietary hash value, and the hash value then computed there is passed on to the authenticating device. If this hash value received by the authenticating device is identical to the hash value computed in the authenticating device using the predefined information, authentication is successful and the interaction is released. In the case of a mismatch, the interaction is otherwise blocked.

In one preferred embodiment of the invention, the TOTP module assigned to the requesting device is a hardware dongle which is externally pluggable into the requesting device. It may be specified that when the hardware dongle is plugged in, the authentication procedure is started automatically.

The aforementioned interactions may be interactions in microcontroller- and/or FPGA-based devices or appliances, e.g. configuration, updating, parameterizing, input, measuring, switching, monitoring and/or control functions.

In another development of the invention, at least one of the TOTP modules is implemented directly as software in the requesting device and/or the authenticating device. Such software is preferably implemented in the authenticating device.

It is also possible that, in order to realize two-factor authentication (2FA), a pre-authentication request with predefined access data is submitted by the requesting device to the authenticating device or inputted there directly, and that a further authentication request is allowed only on condition that a validation check in that respect is successful.

The present invention also specifies that a password and/or a user name and/or a certificate are used as access data. The access data may be stored on a chip unit that operates wirelessly or wired, in particular on a smart card or a USB module.

In one development of the invention, the predefinable item of information is a random value which in one variant is selected from a predefined list of values.

It is also possible that one and the same shared secret is used to authenticate a plurality of requesting devices.

The invention also claims independent protection for a flame monitor, because a particularly suitable field of application for the method according to the invention is that it can be used with sensors, in particular with flame monitors.

The method according to the invention can also be used advantageously in other sensor systems, such as flow rate sensors, filling level sensors, etc.

A device according to the invention for carrying out the method is characterized as follows: A microcontroller- and/or FPGA-based device, for example a flame monitor, is provided for authenticating interactions independently of a system time, in which a cryptographic hash value which can also be in truncated form is computable in a requesting device and in an authenticating device on the basis of a shared secret used by both devices and by a TOTP module that operates in both devices in accordance with the TOTP method, wherein instead of a system time a predefinable item of information for computing the respective hash values can be fed to the TOTP modules. This is done in such a way that the predefinable item of information can be generated or provided by the authenticating device, and in response to a request from the requesting device can be transmitted to the requesting device, where it can then be fed to the TOTP module therein in order to compute a hash value, and the hash value which is then computed there can be passed on to the authenticating device, and such that, if said hash value receivable by the authenticating device is identical to a hash value computed in the authenticating device using the predefined item of information, successful authentication can be performed and the interaction can be released, or can otherwise be blocked in the case of a mismatch.

It is particularly preferred that such a device can be embodied in an embedded system.

The present invention avoids the aforementioned problems with the HOTP, TOTP and OCRA methods in a simple manner by using the known TOTP method, with its disclosed TOTP algorithms, but instead of the system time necessary for that purpose, a predefinable item of information is used, in particular a predefinable random value. It is advantageous, therefore, that no proprietary algorithms are used.

In one preferred embodiment of the invention, a commercially available hardware dongle, which can take the form of a USB flash drive or a smart card or similar, is used in conjunction with a TOTP algorithm. The hardware dongle must allow manual setting of the time to be used. According to the invention, this hardware dongle receives an adjusted value in the form of a predefinable item of information (e.g. a random value) instead of the system time stamp.

As described above, embedded devices often have only limited system power, and in many cases a synchronized system time stamp is not available, either. The method according to the invention, in contrast, allows authentication on a terminal device independently of a system time stamp. A single hardware dongle can be used for authentication at a plurality of terminal devices.

The feasibility of the method according to the invention has been demonstrated in tests. Implementation of the TOTP method, and manual time setting by means of two different TOTP-capable hardware dongles made by two different hardware manufacturers were tested. Examples of hardware dongles include the "Nitrokey Pro 2" (see https://shop.nitrokey.com/de DE/shop/product/nk-pro-2-nitrokey-pro-2-3) and the "OnlyKey" dongles (see https://onlykey.io/de). Via their CLI interface and by entering a command, a value (usually a time value) can be sent to the TOTP generator as input for generating a TOTP token. The two hardware dongles mentioned above are examples only. The method according to the invention can be implemented with any hardware or software generator for TOTP tokens, provided that the time for computing the TOTP token can be set manually.

A Nitrokey Pro 2 or an OnlyKey are USB security modules for processing specific cryptographic tasks. This can be used to manage and use OTP keys, inter alia. Up to 24 OTP keys can be managed simultaneously on the Nitrokey Pro 2 dongle. They are stored in "slots". When a TOTP token is requested, the slot number is specified. Depending on the selected slot, the associated OTP key is used to generate the TOTP token. This TOTP token is then returned.

Figure 2:
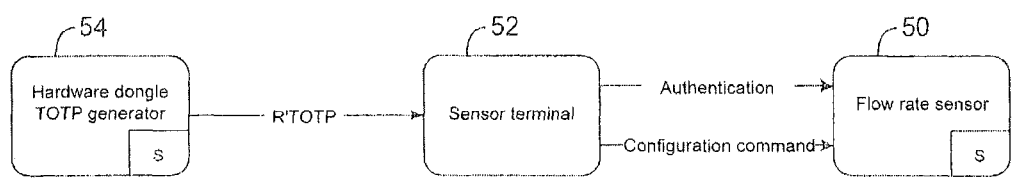
Figure 4:
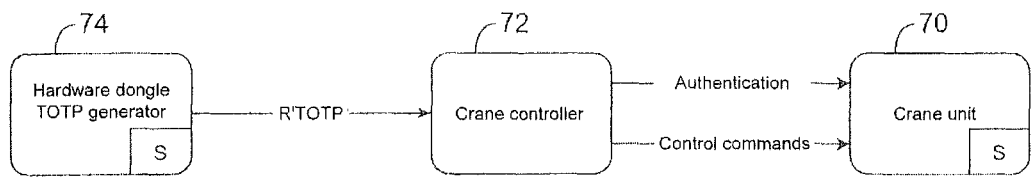
Figure 3:
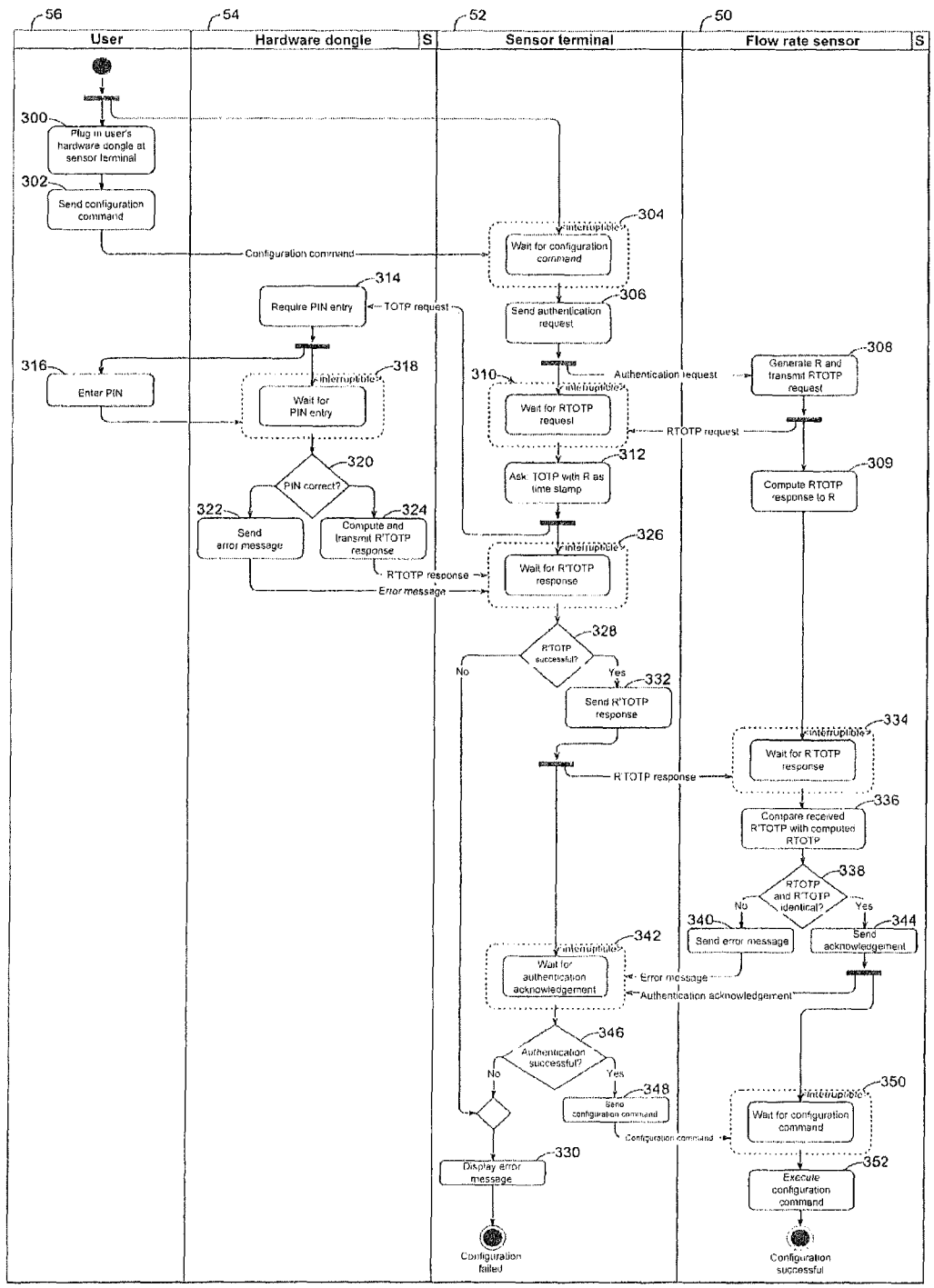
Figure 5:
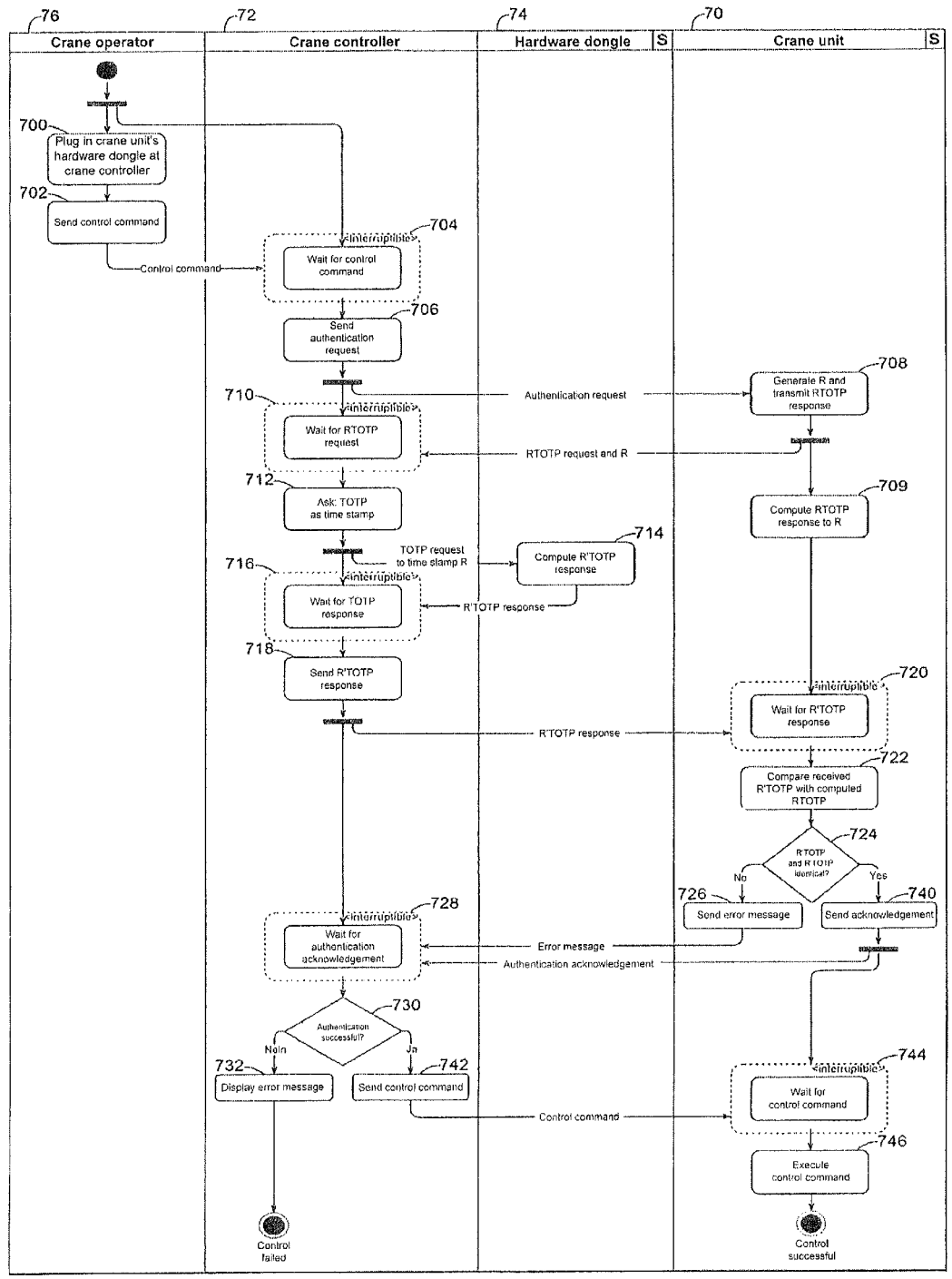

The present invention shall now be described in greater detail with reference to embodiments and flow diagrams, in which:

FIG. 1 is a flow diagram showing the principle of the method according to the invention, FIG. 2 shows a block diagram of a flow rate sensor device, FIG. 3 shows an example of a flow diagram of an authentication method for a flow rate sensor as shown in FIG. 2, FIG. 4 shows a block diagram of a crane controller, and FIG. 5 shows an example of a flow diagram of an authentication method for a crane controller as shown in FIG. 4.

The flow diagram shown in FIG. 1 shows, by way of example, a possible sequence for authenticating interactions in a microcontroller- and/or FPGA-based device or appliance, as may be used in embedded systems and/or flame monitors, in particular. It is important in this regard that this method for authenticating is performed with a conventional TOTP module, but as a prerequisite is independent of a system time. The TOTP module may be implemented as software in the appliance or device, or may be plugged as a hardware dongle into the device or the appliance.

The method outlined in FIG. 1 may be implemented as a single-factor authentication (Option B) or as part of a multi-factor authentication, in this case 2FA (Option A).

The progression over time of the authentication method in FIG. 1 is as follows:

It is assumed that a requesting device 10 communicates with an authenticating device 30. Requesting device 10 has an interface to which a TOTP generator 12 can be connected. This TOTP generator 12 may be implemented in the form of a hardware dongle, for example. Such a hardware dongle is generally designed as a USB flash drive. Authenticating device 30 likewise has a TOTP generator 32. The latter is preferably implemented as software in authenticating device 30. In order to perform an authentication method between requesting device 10 and authenticating device 30, a "shared secret" S is stored in each of requesting device 10 and authenticating device 30. In requesting device 10, this shared secret S is preferably stored in the pluggable TOTP generator 12, i.e. preferably in the aforementioned hardware dongle. The following steps are performed.

1a (A only)—Authentication request by the requesting device 10 with access data:
Via any communication channel, which may be wired or wireless, requesting device 10 submits an authentication request to authenticating device 30. It is also possible to submit an authentication request directly at authenticating device 30, e.g. via a keyboard or an image scanner or similar. The authentication request includes access data Z, for example but not limited to: A password, user name and password, a certificate or smart card, etc.

1b (A only)—Checking the access data of requesting device 10:
Authenticating device 30 checks the validity of the received access data Z.

1 (B only)—Authentication request submitted by the requesting device:
Via any communication channel, which likewise can be wired or wireless, requesting device 10 submits an authentication request TOTP to authenticating device 30. It is likewise possible to submit an authentication request by inputting it directly at authenticating device 30.

2—Generating the predefinable information R on the authenticating device:

Authenticating device 30 generates a predefinable item of information R, e.g. a random value, within the range of values for the TOTP method. Instead of generating a predefinable item of information R, other predefined information, such as values from a list of values, can likewise be used. A combination of both is also possible.

3—Transmitting the predefinable information R to requesting device 10:

The predefinable item of information R must be transmitted to requesting device 10 via any communication channel. This can be implemented by responding to the authentication request or by sending a request of its own to requesting device 10. Optical output on authenticating device 30 is also possible. This must be transferred to requesting device 10 by inputting or scanning it.

4—Request to the TOTP generator of requesting device 10:

Requesting device 10 submits a TOTP request to TOTP generator 12 using the predefinable item of information R (RTOTP request) as a fictitious time stamp. The request is passed on to an TOTP generator 12, in particular a hardware dongle, which is externally connected to requesting device 10 by plugging it into a corresponding plug connection. Instead of a pluggable hardware dongle, the TOTP algorithm may also be implemented in requesting device 10 by means of software.

5—Computation of the R'TOTP

Perform the TOTP computation with the predefinable item of information R on TOTP generator 12 in accordance with the request. This computation may be implemented by the hardware dongle or by software.

6—Response from TOTP generator 12:

Requesting device 10 receives the R'TOTP response from TOTP generator 12. The result computed in TOTP generator 12 is a hash value which is passed on as a truncated hash value R'TOTP to requesting device 10.

7—Transmission of the R'TOTP response to authenticating device 30:

The R'TOTP response must be passed on to authenticating device 30 via any communication channel. It is also possible to input the R'TOTP response directly at authenticating device 30 if there is no connection between requesting device 10 and authenticating device 30.

8—Computation of the reference value on authenticating device 30:

To compare the received R'TOTP response, authenticating device 30 must itself compute an RTOTP response based on the predefinable item of information R that was previously generated. The reference value can be computed at any time after step 2 and before step 9.

9—Comparison of the RTOTP responses:

In a final step, authenticating device 30 must compare the received R'TOTP response with the RTOTP response it itself computed. Only when these two are identical has the R'TOTP response been successfully checked.

10—Transmission of the authentication status:

Authenticating device 30 transmits the status of the authenticating operation, i.e. whether it was successful or whether it failed, to requesting device 10.

The authentication operation is successful if the RTOTP response was successfully checked in step 9 and, in the case of Option A, the validity check on access data Z showed that the access data are valid. If the entire authentication operation was successful, the requested interaction is carried out, otherwise it is not released and is blocked instead.

The advantages of the authentication method according to the invention become clear when its basic principle of operation is described. All that is required is that a common shared secret S is known, preferably stored, at requesting device 10 and at authenticating device 30. This shared secret S is preferably stored in a non-readable form. A predefinable item of information R, e.g. a generated random value or a random value from a list, is inputted at requesting device 10 and converted by means of a conventional TOTP generator 12 into a truncated hash value R'TOTP. Authenticating device 30, which likewise knows the predefinable item of information as a prerequisite, computes for its part its own truncated hash value RTOTP using the TOTP module 32 that is available there. If the two truncated hash values match, authentication via modules 12, 32 is successful.

A specific embodiment of the method according to the invention shall now be described with reference to FIGS. 2 and 3 and with reference to a sensor, such as a flow rate sensor that is used in a pipeline to measure the flow rate. However, instead of a flow rate sensor, some other kind of sensor, in particular a flame monitor or similar, could also be a possible application in which the method according to the invention is used. Such a flame monitor is used, for example, to detect whether or not a flame is present in a burner.

With such sensors, it is imperative that only trained and authorized personnel have access to these sensors. This applies in particular to the maintenance, monitoring, parameterization, configuration, update and control of these sensors. The method according to the invention is ideally suited for such purposes.

For example, in order to correctly calculate the volume of fluid transported, the flow rate sensor must be correctly configured and calibrated. A manipulated calibration or flow rate measurement can cause significant economic damage. It is absolutely essential in this regard that access to the flow sensor be secured and that only authorized persons are allowed such access.

FIG. 2 shows the block diagram of a flow rate sensor device. It shows a flow rate sensor 50, which is mounted, for example, directly on a pipeline (not shown) in order to measure the flow rate. At a distance from it, for example in a waterworks control center, there is a terminal 52 or a PC via which it is possible to establish a link to the flow rate sensor, for example wirelessly (e.g. via a WLAN link). At terminal 52, there is a slot where a hardware dongle 54 with an integrated TOTP generator can be plugged in by an operator.

In the example mentioned, the user or operator does not log in at terminal 52, but the user logs in directly at flow rate sensor 50 by using the method according to the invention. Flow rate sensor 50 is itself the authenticating device within the meaning of the present invention, and terminal 52 is the requesting device. The service technician has access to terminal 52 and plugs a hardware dongle 54 configured for the respective flow rate sensor 50 into terminal 52. Terminal 52 now establishes a connection to flow rate sensor 50, preferably after a previous user PIN request for hardware dongle 54. Only if the previously stored, common shared secret S is known on both sides, and the RTOTP token is computed identically on both sides, can the user log in from terminal 52, and flow rate sensor 50 thus be configured or calibrated.

The RTOTP token is computed, on the terminal 52 side, in the hardware dongle 54 that is plugged in. This means there is no need for fixed assignment of a particular terminal 52 to a flow rate sensor 50. Loss or theft of terminal 52 is not a critical incident, because no authentication data of any kind for logging in at sensor 50 can be stolen, so unauthorized configuration of flow rate sensor 50 is not possible using terminal 52 alone.

By sequentially checking the continued availability of hardware dongle 54 at sensor terminal 52, it is also possible to ensure that configuration/calibration is only possible if hardware dongle 54 is plugged in. If hardware dongle 54 is removed, the user is logged out of flow rate sensor 50.

For example, if the user takes a break, he takes hardware dongle 54 with him. Unauthorized configuration is not possible, therefore, even when there is unprotected access to terminal 52. However, unauthorized access to hardware dongle 54 should be avoided. A physical and tangible key, in the form of hardware dongle 54 is thus used to log in to a digital interface.

The functional procedure shall now be described with reference to FIG. 3.

FIG. 3 shows, by way of example, the chronological order in which communication for authentication is organised. Flow rate sensor 50 communicates wirelessly or in a wired manner with a terminal 52, at which a hardware dongle 54 of a user 56 can be plugged in. This hardware dongle 54 has an internal TOTP generator in which a shared secret S is stored. This shared secret S is also stored in flow rate sensor 50. Flow rate sensor 50 also has an internal TOTP generator, which is implemented in the form of a TOTP module that can be implemented by software.

It is assumed that user 56 wants to retrieve data from flow rate sensor 50. To do so, user 56 must prove that he is also authorized to retrieve such data. The authentication method according to the invention is used for that purpose.

In a first step 300, user 56 plugs his hardware dongle 54 into sensor terminal 52. When this hardware dongle 54 is plugged in, a configuration command is sent in a subsequent step 302 to sensor terminal 52. Sensor terminal 52 waits for such a configuration command in step 304. As soon as this configuration command has been received, sensor terminal 52 sends an authentication request to flow rate sensor 50 in step 306. In step 308, an RTOTP request is generated in flow rate sensor 50, and sensor terminal 52 is sent the request. Sensor terminal 52 waits for that request in step 310. When the RTOTP request is sent from flow rate sensor 50 to sensor terminal 52, a predefinable item of information R provided in flow rate sensor 50 and generated, for example, as a random value, or which can be derived from a previously stored list of values, is communicated to sensor terminal 52. In step 310, sensor terminal 52 thus receives the predefinable item of information R for subsequently computing an associated hash value or truncated hash value. In step 312 that follows, sensor terminal 52 submits an RTOTP request to hardware dongle 54, in which the predefinable item of information R is provided as a fictitious time stamp to the TOTP generator in hardware dongle 54.

To make the authentication method even more secure, an additional identification process is carried out at the hardware dongle, as shown in FIG. 3. Here, user 56 must identify himself as an authorized person at the hardware dongle by entering a PIN. This is done in step 314. The user is prompted to enter a PIN. Instead of entering such a PIN, it may also be necessary to insert a smart card, to place a finger on a suitable fingerprint sensor, or similar. In step 316, user 56 enters a PIN. Hardware dongle 54 waits for that input in step 318. As soon as the PIN has been entered by user 56, a check on whether the PIN was correctly entered or not is carried out in step 320. If the PIN was not entered correctly, an error message is transmitted from hardware dongle 54 to sensor terminal 52 in step 322. If, on the other hand, the PIN was entered correctly in step 320, the truncated hash value R'TOTP is computed in step 324. In step 324, this value is transmitted to sensor terminal 52, which waits for the R'TOTP response in step 326.

In step 328, sensor terminal 52 establishes whether an error message or R'TOTP response was previously received in step 326. If an error message has been received, an error message is issued in step 330 that follows, and any configuring or read-out of flow rate sensor 50 is blocked.

If it has been detected in step 328 that there is no error message, but that an R'TOTP response has been received, then this R'TOTP response is sent to flow rate sensor 50 in step 332 that follows. In flow rate sensor 50, a proprietary truncated hash value RTOTP is computed in an internal computing step 309. To that end, a conventional TOTP generator in flow rate sensor 50 is used, which instead of a time stamp is given exactly the same predefinable item of information R that was previously sent to sensor terminal 52 in step 308. A truncated hash value RTOTP is computed from that in the TOTP generator of flow rate sensor 50. The R'TOTP response from sensor terminal 52 is waited for in step 334. As soon as such an R'TOTP response has been received from sensor terminal 52 at flow rate sensor 50, the R'TOTP response from sensor terminal 52 is compared with the computed RTOTP value according to step 309 in flow rate sensor 50 in step 336. This comparison is carried out in step 336. It is then decided in step 338 whether the result of comparing the two values is correct or not. If the comparison in step 338 indicates that the two values are not correct, an error message is sent to sensor terminal 52 in step 340. In step 342, sensor terminal 52 waits for a response from flow rate sensor 50. If the result of comparison is positive, on the other hand, i.e. the R'TOTP value computed in sensor terminal 52 and the RTOTP value computed in flow rate sensor 50 are identical, then an acknowledgement of authentication, i.e. of correct authentication, is then sent to sensor terminal 52 in step 344.

Whether authentication was successful or not is decided in sensor terminal 52, depending on the result of comparison in step 338. This is done in step 346. If authentication of the truncated hash values R'TOTP and RTOTP was not successful, an error message is displayed and the method jumps to step 330. However, if authentication of the truncated hash values was successful, a configuration command is sent in step 348 to flow rate sensor 50, which waits on it in step 350. In step 352, the configuration command is triggered in flow rate sensor 50 and, if applicable, a signal is given that positive authentication has been performed. If that is the case, flow rate sensor 50 can be read out, configured, given a new update, parameterized, and so on by user 56.

Although a PIN has been entered and thus an additional identification process in respect of the user has been carried out at the hardware dongle, entering such a PIN is merely optional in the context of FIG. 3 and steps 314 to 320. The method described can be carried out without such PIN entry. However, authentication is less secure in that case, and it is not possible, in particular, to prevent successful identification using a stolen hardware dongle.

In a second embodiment, which is illustrated in FIGS. 4 and 5, a crane controller 72 of a crane unit 70 (for example of a container gantry crane or of a lattice tower crane) is presented. The authentication method according to the invention is again used.

In this embodiment, the following conditions are to apply. Crane unit 70 is controlled by radio. Only trained and authorized personnel may have access to the place where the remote control of crane controller 72 is kept. Only this authorized personnel has access also to the hardware dongle 74 belonging to crane unit 70. A prerequisite is that a common shared secret S is stored in crane unit 70 and in hardware dongle 74.

An operator usually always logs in by means of a human-machine interaction. This is often prone to error or is carried out in an unsecure manner by human beings. For example, there is no log out from the system when operation is briefly paused. Similarly to a Windows PC, on which a screen lock is activated when leaving the workplace, it is possible to increase significantly the cyber security of a crane unit in operation by means of a simple-to-use authentication measure.

The risk of a radio-based authentication attack on the controller of crane unit 70 can also be greatly reduced by a second authentication factor, since no static authentication data are used.

In the present example, crane operator 76 does not log on to the remote control of crane controller 70. Instead, the remote control authenticates itself at crane unit 70 via the method according to the invention. To do so, crane operator 76 has access to the remote control and inserts the hardware dongle 74 configured for the respective crane unit 70 into the remote control of crane controller 72. The remote control establishes a connection to crane unit 70 via the method according to the invention. Only if the shared secret S is known on both sides, and the RTOTP response is therefore computed identically on both sides, can the remote control of crane unit 70 log in and the crane unit thus be controlled. On the remote control side, the RTOTP response is computed in hardware dongle 74, which has to be inserted into the remote control. This means there is no need for fixed assignment of a particular remote control to a crane unit 70. Loss or theft of the remote control is no longer a critical incident, either, because there are no authentication data in the remote control for logging on to a crane unit 70, so malicious control of a crane unit is no longer possible. However, hardware dongle 74 must be looked after, and its loss must be avoided.

By sequentially checking the continued availability of hardware dongle 74 at the remote control, it is also possible to ensure that controlling a crane is only possible when hardware dongle 74 is inserted into the remote control. If hardware dongle 74 is removed, the remote control is preferably logged off automatically from crane unit 70. If crane operator 76 takes a break, for example, he takes hardware dongle 74 with him. Unauthorized operation of crane unit 70 is no longer possible, therefore, even when access to the remote control of crane controller 72 is unprotected.

FIG. 5 shows the flow chart for authentication of a crane driver 76 at a crane unit 70, as it progresses over time. Crane operator 76 is to control crane unit 70 via a crane controller 72. Crane controller 72 is equipped with a hardware dongle 74, which is a physical and tangible authorization key for an authorized crane operator 76. A TOTP module in the form of a TOTP generator is integrated in hardware dongle 74. In addition, a shared secret S is stored in hardware dongle 74. This shared secret S is also stored in crane unit 70. A TOTP generator is also integrated in crane unit 70. The functional sequence with which crane controller 72 legitimizes itself so as to be allowed to operate crane unit 70 is as follows:

In step 700, crane operator 76 inserts the hardware dongle for crane controller 72 at crane controller 72, for example into the remote control provided. In step 702, crane operator 76 then sends a control command to crane controller 72. Crane controller 72 waits for such a control command in step 704. In step 706 that follows, crane controller 72 sends an authentication request to crane unit 70, where an "RTOTP request" is generated in step 708 by providing a predefined item of information R, which is randomly generated or can be taken from a list of values. This predefinable item of information R is transmitted in the form of an RTOTP request back to crane controller 72, which waits for it in step 710. On the basis of that request and the transmitted predefinable item of information R, a request is generated in crane controller 72 in 712, which latter request is then sent as an RTOTP request to hardware dongle 74. In step 714, an R'TOTP response is then generated in the local TOTP generator in hardware dongle 74 using the predefinable item of information R and sent to crane controller 72, which waits for such a response in step 760. In step 718 that follows, crane controller 72 sends that R'TOTP response, i.e. a truncated hash value, to crane unit 70. Crane unit 70 waits for such a response from crane controller 72 in step 720. Prior to that, in step 709, an RTOTP response was computed in the local TOTP generator in crane unit 70 using the predefined item of information R mentioned above. The RTOTP response is a truncated hash value. In step 722, the RTOTP value computed in crane unit 70 is compared with the R'TOTP value received from crane controller 72 or from the hardware dongle 74 connected thereto. In step 724, the result of the comparison in step 722 is determined. If the result of the comparison is a mismatch, an error message is sent in step 726 to crane controller 52, which waits for a response from crane unit 70 in step 728. An authentication result is waited for at the same time in step 730, and in step 732, an error message signaling that the comparison between the truncated hash values R'TOTP and RTOTP produced a negative result is displayed. Control of crane unit 70 has failed and is blocked. This can be displayed accordingly in step 732.

If, on the other hand, the comparison in step 722 results in a match, a positive result of comparison is signaled in step 724. An acknowledgement that the comparison of R'TOTP and RTOTP resulted in a match is sent in step 740. This positive result in step 740 is communicated to crane controller 72, which detects successful authentication in step 730 and sends a control command to crane unit 70 in step 742. In step 744, crane unit 70 waits on such a control command. In step 746, crane unit 70 then executes the control command requested by user 76.

In the crane controller shown in FIG. 5, in contrast to the embodiment shown in FIG. 3, the user is not identified additionally with the hardware dongle. Previous successful entry of a PIN is not envisaged in the embodiment in FIG. 5, but may be specified there also.

LIST OF REFERENCE SIGNS

10 Requesting device
12 TOTP generator
30 Authenticating device

32 TOTP generator
50 Flow rate sensor
52 Terminal
54 Hardware dongle
56 User
70 Crane unit
72 Crane controller
74 Hardware dongle
76 Operator, crane operator
S Shared secret
Z Access data
R Predefinable information, random value
RTOTP Hash value in the authenticating device 30,
R'TOTP Hash value in the in the requesting device 10,
300-352 Steps
700-746 Steps

The invention claimed is:

1. A method for authenticating interactions in microcontroller- and/or FPGA-based devices or appliances independently of a system time, in particular in embedded systems and/or flame monitors, comprising the steps of:
calculating a cryptographic hash value in a requesting device and in an authenticating device on the basis of a shared secret used by both the requesting device and the authenticating device
using a TOTP module (12, 32) in the requesting device and a TOTP module in the authenticating device in accordance with the TOTP method, wherein instead of a system time a predefinable item of information for calculating respective hash values is fed to the TOTP modules of the requesting device and the authenticating device, in such a way that the predefinable item of information is generated or provided by the authenticating device and in response to a request from the requesting device or in response to direct input to the authenticating device is transmitted to the requesting device, where the predefinable item of information is fed to the TOTP module of the requesting device in order to compute a hash value, and
passing the hash value computed by the requesting device to the authenticating device, and if said hash value received by the authenticating device from the requesting device is identical to a hash value computed in the authenticating device using the predefined item of information, authentication is successful and an interaction is released, or otherwise blocked in a case of a mismatch.

2. The method according to claim 1, wherein a hardware dongle which is externally pluggable into the requesting device is used as the TOTP module assigned to the requesting device.

3. The method according to claim 1, wherein the hash value is provided as a truncated hash value.

4. The method according to claim 1, wherein at least one of the TOTP modules is implemented directly as software in the requesting device and/or in the authenticating device.

5. The method according to claim 1, wherein in order to realize two-factor authentication (2FA), a pre-authentication request with predefined access data is submitted by the requesting device to the authenticating device or inputted there directly, and that an authentication request is allowed if a validation check in that respect is successful.

6. The method according to claim 5, wherein a password and/or a user name and/or a certificate are used as the predefined access data.

7. The method according to claim 5, wherein the predefined access data are stored on a chip unit that operates wirelessly or wired, in particular on a smart card or a USB module.

8. The method according to claim 1, wherein the predefinable item of information is a random value which is generated or selected from a predefined list of values by the authenticating device.

9. The method according to claim 1, wherein one and the same shared secret is used to authenticate a plurality of requesting devices.

10. The method according to claim 1, wherein interactions in microcontroller- and/or FPGA-based devices or appliances are configuration, updating, parameterizing, measuring, operating, switching, monitoring and/or control functions in industrial systems.

11. The method according to claim 1, wherein the method is carried out in a microcontroller and/or an FPGA of a flame monitor.

12. A microcontroller- and/or FPGA-based device for authenticating interactions independently of a system time, in which a cryptographic hash value is computable in a requesting device and in an authenticating device on the basis of a shared secret used by both the requesting device and the authenticating device and in a TOTP module that operates in both devices in accordance with the TOTP method, wherein instead of a system time a predefinable item of information for computing respective hash values is feedable to the TOTP modules in such a way that the predefinable item of information can be generated or provided by the authenticating device and in response to a request from the requesting device can be transmitted to the requesting device, where predefinable item of information can then be fed to the TOTP module therein in order to compute a hash value, and the hash value computed there can be passed on to the authenticating device, and if said hash value receivable by the authenticating device is identical to a hash value computed in the authenticating device using the predefined item of information, authentication can be performed successfully and the interaction can be released, or can otherwise be blocked in a case of a mismatch.

13. The device according to claim 12, wherein the microcontroller- and/or FPGA-based device is an embedded system.

14. A flame monitor, said flame monitor having the microcontroller- and/or FPGA-based device according to claim 12 for authenticating interactions independently of a system time.

15. The method according to claim 2, wherein the hash value is provided as a truncated hash value.

16. The method according to claim 2, wherein the predefinable item of information is a random value which is generated or selected from a predefined list of values by the authenticating device.

17. The method according to claim 3, wherein the predefinable item of information is a random value which is generated or selected from a predefined list of values by the authenticating device.

18. The method according to claim 2, wherein one and the same shared secret is used to authenticate a plurality of requesting devices.

19. The method according to claim 3, wherein one and the same shared secret is used to authenticate a plurality of requesting devices.

20. The flame monitor as recited in claim 14, wherein the microcontroller- and/or FPGA-based device is an embedded system.

\* \* \* \* \*